Patented June 5, 1923.

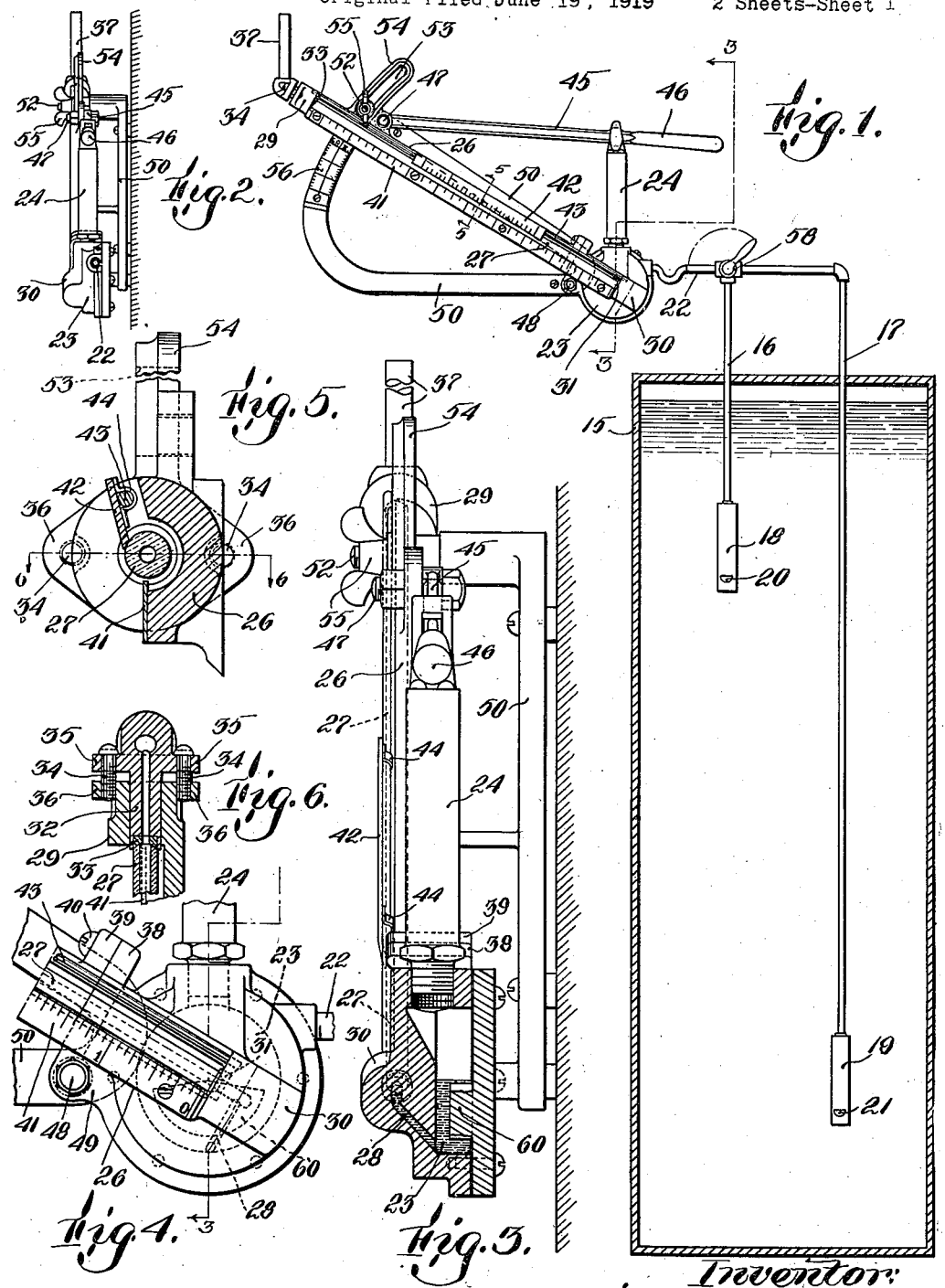

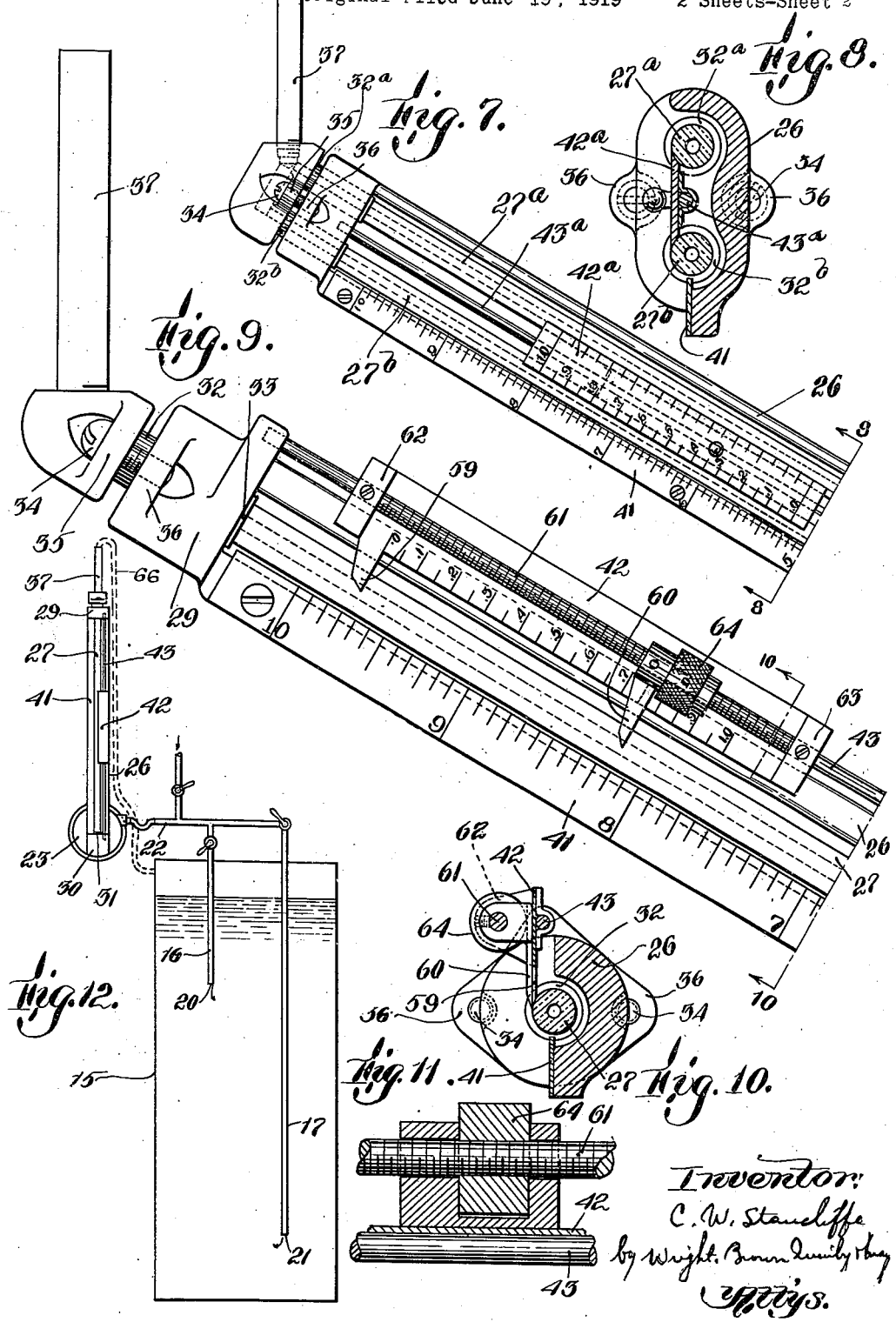

1,457,406

UNITED STATES PATENT OFFICE.

CECIL W. STANCLIFFE, OF NEW YORK, N. Y., ASSIGNOR TO PNEUMERCATOR COMPANY, OF NEW YORK, N. Y., A CORPORATION OF MAINE.

DEPTH AND SPECIFIC-GRAVITY MEASURING APPARATUS.

Application filed June 19, 1919, Serial No. 304,871. Renewed May 16, 1921. Serial No. 470,202.

*To all whom it may concern:*

Be it known that I, CECIL W. STANCLIFFE, a subject of the King of Great Britain, residing at New York, in the county and State of New York, have invented new and useful Improvements in Depth and Specific-Gravity Measuring Apparatus, of which the following is a specification.

The purpose of the present invention is to provide an apparatus adapted to measure with accuracy the depth of liquids of different specific gravities in tanks or other containers; and also to indicate the specific gravity of any liquid, whatever it may be. This object is accomplished by combinations of elements which may have various forms and modes of assemblage, all embodying the same fundamental principles, which, briefly stated, are: Two or more pipe lines, adapted to be submerged in a body of liquid of which the depth and specific gravity are to be measured, such lines having discharge orifices at levels which are a known distance apart; one or a plurality of column indicators containing liquid such as mercury, both the indicating column and the pipe lines being connected with a chamber containing the indicating liquid; and means for applying pneumatic pressure in the last-named chamber or to some other part of the pipe line in such manner that all liquid occupying the pipe line is blown out therefrom down to the level of its discharge orifice and the same pneumatic pressure is caused to act on the indicating column and elevate the latter to a height sufficient to balance the pneumatic pressure. For certain purposes the instrument or apparatus may be equipped with provisions for inclining the indicating column at different angles with the horizontal, while for other purposes and uses the column may be maintained in a fixed position with respect to its surroundings. For instance, the column may be vertical when the instrument is applied for uses on land, or, in application to marine use, vertical when the ship is on an even keel. With such indicator may be combined proper scales or index means, showing the inclination of the indicating column, or values derived from such inclination, with reference to the horizontal or some arbitrarily selected point of departure; and showing, further, the position of the head of the liquid column in the indicator, and differences between two or more positions of the head of such column.

In the following specification, and in the drawings provided therewith, I have described and shown the principles of the invention in a satisfactorily operative apparatus, together with some of the modifications or modified forms in which the indicating or registering part of the apparatus may be made.

As further explaining the purpose and utility of the invention, I would state that it is frequently necessary to know the quantity, depth or weight of liquid contained in tanks, as, for example, oil in storage tanks, and specifically the quantity or depth in the fuel tanks of the oil fuel carried by steamships. Oils derived from different sources vary more or less in their density, and the same oil likewise varies in density and volume with different conditions of temperature to which it is subjected, that is, as it is warmer or cooler. When the volume of a body of oil is known, its specific gravity must also be known in order to calculate its weight, when there is occasion for knowing the weight of the oil; and, when the depth of such a body is to be determined by creating a pneumatic pressure sufficient to balance the hydrostatic head of the liquid above a point at a given depth in the tank or container and measuring the intensity of such pressure, the specific gravity must likewise be known, in order that the true depth may be determined from the pressure reading.

The apparatus in which my invention is embodied is of the type in which an air pressure is developed sufficient to balance the head of liquid above the reference level with respect to which the depth is measured, and in which the pressure of the air applied for this purpose is measured by the height of an indicating column of liquid supported by the air pressure.

The novelty of the invention may be said to consist in the provision of means in connection with an instrument of this type by which the specific gravity may be readily and accurately determined; and by which, also, when the specific gravity is known, the actual depth, or values which are functions of the depth and are derived directly or indirectly therefrom, of the reference level below the surface of the liquid may be determined by direct reading of the colmn of indicating liquid with respect to a suitable scale.

It is not to be assumed from the foregoing reference to the use of my apparatus for measuring the depth and specific gravity of oil in tanks, that the invention is limited to that or any other specific use. Such use is one to which the apparatus is extensively applied, and for which it is admirably adapted, but of course, I claim protection for the principles of the invention embodied in the apparatus or instrument applied to ascertaining specific gravities, depths, volumes, weights, and other values of any fluids in the ascertainment of which it is adapted to be used. In the following specification, however, I will for brevity assume that the embodiment of the invention which I am about to describe is installed and used to measure depths and specific gravities of oil.

In the drawings:

Figure 1 is an elevation of a form of apparatus embodying the invention, set up in condition for use with a tank containing oil.

Figure 2 is an elevation, as seen from the right of Figure 1, of the indicating part of the apparatus separated from the pipe line which leads to the oil tank.

Figure 3 is an elevation on an enlarged scale of the instrument as viewed from the right of line 3—3 of Figure 1, the parts cut by said line being shown in section.

Figure 4 is an elevation of the lower part of the instrument shown in Figure 3.

Figure 5 is a cross section, enlarged, taken on line 5—5 of Figure 1.

Figure 6 is a section on line 6—6, Figure 5. It shows a longitudinal section of the extremity of the indicator of the instrument.

Figure 7 is an elevation of a modified form of indicator.

Figure 8 is a cross section of the same, on line 8—8 of Figure 7.

Figure 9 is still another modified form of indicator.

Figure 10 is a cross section on line 10—10 of Figure 9.

Figure 11 is a detail of the contrivance shown in Figure 9.

Figure 12 is an illustrative view showing the present invention embodied in an apparatus having a vertical indicating column.

Describing first the specific form of the invention shown in Figures 1 to 6 inclusive, 15 represents a tank, containing the liquid of which the depth is to be measured and the specific gravity to be determined (assumed to be oil for the purpose of this description). The structure thus designated as a "tank" is intended to typify any sort of container, whatever may be its form and construction capable of holding a body of liquid. 16 and 17 are two pipes or conduits, which pass into the tank, being here shown as entering through the top, but they may enter through any part of the tank. These lines enter and communicate with the balancing chambers 18 and 19 respectively, which are submerged in the oil, and are provided with external orifices 20 and 21 respectively. Essentially the balancing chambers form parts of the pipe lines, that is, their terminal parts and the orifices are the outlets from which air may escape when supplied to the pipe lines under pressure great enough to balance the head of liquid above the orifices. These are provided in the sides of the balancing chambers to secure accuracy in the balance between the head of liquid and the pneumatic pressure, that is, to establish the position of the bottom of the oil column which balances the pneumatic pressure at a definite and exact level.

The levels thus established by the orifices 20 and 21 respectively are at a known vertical distance apart. This is an essential condition of the invention. The pipe lines 16 and 17 join the common conduit 22, which enters a chamber 23 containing mercury, or any other liquid suitable to be used as an indicator in a transparent tube. To the upper side of the chamber 23 is connected an air pump 24, and at the side of the chamber is secured an arm 26, supporting an indicating tube 27, which is in communication with the mercury chamber or pot 23 by a passage 28 in the front wall of such chamber, as shown in Figure 3. This passage opens at such a low point of the chamber that its opening is well below the level of the mercury therein. It should be said, also, that the connection of the pipe line 22 with the chamber is necessarily above the level of the mercury, and that the inlet to the chamber from the air pump is preferably above such level. A convenient mode of mounting the indicating tube 27, which is of transparent material, preferably glass, is to provide in the forward side of the arm 26 a longitudinally-extending groove and near its extremity a shoulder 29, having a passage in extension of such groove, and further to provide on the front wall of the mercury pot a boss 30, with a passage in line with the bore of the tube, from which passage the channel 28 opens. The indicator tube 27 is laid in the groove in the arm, with one end bearing against the boss 30 and packed by a washer 31 (see Figure 4), while its other end is engaged with a retainer 32, passing through the passage in the shoulder 29, and having at its inner end a socket containing a washer 33 to bear against the tube, as shown in Figure 6. This retainer is secured by screws 34, passing through lugs 35 on the retainer into tapped holes in lugs 36 on the end of the arm 26. The retainer has a bore to give access of atmospheric pressure to the head of the mercury column in the indicating tube, and it carries an extension tube 37 to guard against loss of mercury by the application of excessive pneumatic pressure in the chamber 23. The arm 26 is rigidly secured to the chamber by lugs 38 and 39 (the former being on the chamber and the latter on the arm), and by a screw 40. A fixed, graduated scale 41 is mounted on the arm 26 at one side of the tube 27, and a sliding scale 42 is mounted at the opposite side of the tube on a guide-rod 43, which runs parallel to the tube, or approximately so, between the bosses 30 and 29. The mode of mounting the sliding scale is clearly shown in Figures 3 and 5, and comprises straps 44, secured to the scale and passing around the rod.

The pump 24 here shown is a piston pump of simple construction, conveniently similar in principle to the well known and common types of tire pump, the piston rod being coupled with an arm 45, having a handle 46, which is connected by means of a pivot 47 with the previously described supporting arm 26. Other means for supplying air under pressure may be provided, wherefore the pump here shown is to be considered as typical of any means adapted for this purpose.

The mercury chamber and arm 26, with the indicating tube and the pump, comprise a rigid structural unit, and this entire unit is mounted with provision for adjustment angularly about a pivoted axis, such axis being a pivot or fulcrum stud 48, passing through a lug 49 on the side of the mercury chamber into a frame 50, which is immovably mounted in any desired way upon a fixed support, such as a wall or a bulkhead in a ship, or an instrument board. This frame carries another stud 52, which passes through a slot 53 in a lug 54 extending from the side of arm 26, such slot being concentric with the pivot axis 48, and in the stud 52 is mounted a clamp nut 55, for the purpose of securing the adjustable unit in any of the positions permitted for its angular adjustment within the range limited by the length of the slot 53. There is a scale 56 on the frame 50, in position to cooperate with an index on the arm 26, and graduated to read in any desired terms or units, such, for example, as degrees of angle from any selected starting point, or in terms of specific gravities with reference to unity, or of some conventional scale of specific gravities, such as the Baumé scale.

The fixed scale 41 is graduated to read in any desired units, but preferably in terms of the depth of liquid in the tank balancing the pressure head of the indicating column beside such scale, while the sliding scale 42 is preferably graduated to read in terms of specific gravity according to any desired system.

In the apparatus as here shown, the indicator column is always at an inclination to the horizontal, in order to permit a heavy liquid like mercury to be used for measuring relatively slight depths of oil and slight differences in depth. Thus, if the tube is at an inclination of 30°, the length or movement of the indicating column in measuring any pressure or difference in pressure will be twice as great as the height or movement of a vertical column in measuring the same pressure; or, in other words, the length or movement of the column is equal to that of a vertical column multiplied by the reciprocal of the sine of the angle of inclination.

There is a flexible connection at some point in the pipe line, preferably near the mercury chamber, in order to permit freedom of tilting movement of the indicator.

A valve 58, in the present instance a three-way cock, is interposed between the conduit 22 and the pipe line 16, and is operated to connect either the pipe line 16 or the pipe line 17 with the conduit 22, excluding the other. Equally, however, separate valves may be provided at the entrances to the several individual pipe lines, and other types of distributing valves may be used where there are two, or more than two, pipe lines with submerged orifices.

Preferably this instrument is calibrated to indicate correctly on the scale 41 the depth in feet and inches of water in the tank at unit specific gravity when the indicating column is at a given inclination, for example 30°. This position of the indicator is marked as unity on the scale 56, or with the value of the specific gravity of water when such scale is laid out according to the Baumé or other arbitrary scale. As here shown, the edge of arm 26 which crosses the scale 56 is the index previously referred to as being on the arm co-operating with the scale, but any other character of index may be used equally well. Two or more scales graduated in these or other systems may be arranged side by side at this point, and I have in fact represented two such scales in Figure 1.

As the outlets 20 and 21, which I will now call the zero points, of the pipe line are at a known vertical distance apart, the graduations of the sliding scale 42 are laid out according to the length of the indicating column which balances the head of water equal to this vertical distance. That is to say, for example, that, if the difference of level between the zero points is three feet, then the distance between the zero and unity on the specific gravity scale 42 is equal to the length of the column of mercury in the inclined tube 27, which balances a head of three feet of water, of which the specific gravity is 1. With the tube at 30°, this distance is 5.29 inches. Preferably the distance between zero and unity of the scale is divided into decimal fractions, and the scale may also be extended in the same ratio beyond unity to measure liquids of specific gravity greater than 1. Of course, instead of graduating the sliding scale according to the figures or values here named, the reference angle may be put at anything else than 30°, and the scale may be graduated in other terms than decimals of unity, for instance in the terms of the Baumé scale, or in both the unit scale and an arbitrary scale.

Now, in order to determine the specific gravity of oil in the tank, the indicator is first placed at the angle corresponding to unity on the scale 56. Then the three-way valve 58 is placed to connect pipe line 16 with conduit 22 and to close off pipe line 17, and the pump 24 is operated to compress air in the mercury chamber and pipe line. When a pressure has been reached great enough to balance the head of oil above the zero point 20, air is blown through the pipe line and out from the orifice. Then the pump is stopped and the excess of air allowed to escape through the oil. Then, when equilibrium has been established between the air pressure and the head of oil at the orifice, the sliding scale 42 is set with its zero point beside the head of the mercury column in tube 27. Then the valve 58 is turned to shut off pipe line 16 and open pipe line 17, and the pump is again operated until air escapes from the zero outlet 21. A greater pneumatic pressure is thus created, balancing the head of oil above the point 21, and the mercury column is forced to a correspondingly greater height. The graduation on the scale 42 beside the new position of this column shows directly the specific gravity of the oil, because the difference between the levels of the two positions of the column is proportionately as much less than the length of the column balancing the head of water equal to the vertical distance between the zero points as the weight of the oil is less than that of water. If, now, the indicator is tilted to a less angle with the vertical until the index on the arm 26 is beside the graduation of scale 56 for the specific gravity thus determined, the head of the mercury column will travel along the tube, assuming that no loss of the pneumatic pressure has occurred, because the column stands constantly at the same absolute height, and then the graduation of scale 41 beside the head of the column measures the actual depth of the zero point 21.

In giving the foregoing example, I have assumed that the zero of the scale 42 is at its lower end, and have described the steps in the order proper to be taken when that condition exists; but obviously the arrangement of the scale may be reversed, and so, also, may the order in which air is blown through the pipe lines successively be reversed.

If the specific gravity is known in advance, the depth may be correctly determined at once by setting the indicator tube at the inclination established by the scale 56 for this specific gravity, and working the pump and taking the reading, as described. Thus the instrument may be used for determining either the depth of a body of liquid of any gravity, or the specific gravity, independently of one another, or both these values, and it may be used to determine the specific gravity at any depth in a body of liquid by providing flexible pipe lines to permit their zero points to be raised or lowered and maintaining the zero points of the two lines at a known distance apart, or by arranging the pipe lines in any other manner so that the zero points may be raised and lowered to the stratum of the liquid whose gravity is to be made known.

Another result which may be obtained by this apparatus, particularly when the zero points are capable of being raised and lowered as last stated, is that of determining the depth of a layer of some foreign liquid in the bottom of a tank, when the specific gravity of such liquid is known, as water in the bottom of a gasolene tank, for example. The specific gravity of the gasolene (or other liquid legitimately in the tank) being known, or having been determined by the means previously explained, the zero points are lowered until the lower point is at the bottom of the tank, or near the bottom at a known height above it. Then the average specific gravity of the liquid between the zero points is found in the same way. Thereupon the depth of the foreign liquid may be readily determined by calculation.

The foregoing description of operation is illustrative only, and not intended in any wise as a limitation in the scope of the protection which I claim for this invention. Whatever may be the specific values and character of the scales and the indications thereon, and whatever may be the inclination of the indicating tube or the nature of the liquid used to form the indicating column, whether such liquid is mercury or a lighter liquid, the mode of operation is essentially the same. The same instrument or apparatus may likewise be used without shifting the zero point, by having a large number of pipe lines with zero points at different depths in the tank, whereby, upon proper manipulation of the controlling valves, and operation of the pump as required, the average gravity of the whole body of liquid, or the gravity of any selected strata of the body, may be determined. In this way the weight of a body of oil or other liquid may be made known, and an accurate means established for measuring the value of liquid fuel. The measurement of liquids in terms of volume is a most inaccurate method, because the volume changes very much with different temperature conditions.

Referring now to Figures 7 and 8, I have shown a modified form of indicator, in which two tubes containing indicating liquid are shown, these being designated 27$^a$ and 27$^b$, and mounted in a modified form of arm 26. A sliding specific gravity scale 42$^a$ is provided to slide on a rod 43$^a$ between the tubes. This form of indicator has the advantage that the two tubes may be independently connected with two pipe lines having zero outlets and both operated at the same time, and the specific gravity determination made by measuring on the scale 42$^a$ the longitudinal difference between the heads of the two columns.

The modification shown in Figures 9, 10, and 11 embodies the combination with a sliding scale 42, such as already described, of a fixed index 59 and an adjustable index 60, both carried by the scale. The fixed index is located in register with one end of the specific gravity graduations while the other is slidably mounted on a threaded rod 61, which is fixed in lugs 62 and 63 which rise from opposite ends of the scale plate. A nut 64 is internally threaded to mesh with the threads of said rod and is suitably engaged with the movable index 60 whereby to shift the same endwise upon the rod when the nut is rotated. The entire scale, carrying these indexes slides bodily on the guide rod 43 as already described, being mounted in any suitable way to permit endwise sliding movement and preferably also to cause the slide to be retained frictionally in any position. By means of this improvement the specific gravity indication made in the first place may be accurately determined, and in the second place may be rendered permanent until a later reading is taken.

This permanency in the placement of the adjustable index enables the sliding scale equipped with such index to be used for checking the accuracy of the reading previously taken, since the entire device, composed of the sliding scale and the index projections, may be shifted as a unit without disturbing the adjustment of the index 60. Thus, if a reading for specific gravity has been taken with the indicator at a given angle, say 30°, for illustration, and then the indicator is shifted to an angle which, measured on the scale 56, corresponds to the specific gravity value so determined, and the index 60 then shifted to the position on the sliding scale 42 beside the indication which represents unity; and if then the instrument be operated as before so as to produce pressures acting successively on the indicator and corresponding to the depths of the respective orifices in turn, the head of the indicating column should move between the two indexes. In making this test the sliding scale will be shifted to bring the appropriate index over the head of the column when air is blown through one pipe line and then when air is blown through the other pipe line, the column should rise to the position of the other index. If it does not do this, that fact shows that an error was made in the first reading.

The indexes 59 and 60 enable more precise readings to be taken than is possible with the forms of the invention first described because they extend over the column, whereby their reading edges or points may be placed in exact tangency with the meniscus at the head of the liquid column in the tube, and their sighting lines extend to or across the graduated edge of the scale 42 and correlate the positions of the indication column with the scale. Thus the relation of the column to the scale is more accurately determined through elimination of the errors which are liable to arise from the effort to sight by the unaided eye from an indicating column to a scale some distance away to one side.

The index device embodied in the sliding scale and indexes 59 and 60 is a sub-combination of the apparatus herein disclosed for which I desire protection by itself and in whatever combination and for whatever purpose it may be used. For the purpose of convenient definition of this device in the claims, it may be considered as consisting of a frame, namely, the plate which bears the scale 42 and the lugs 62, 63, which frame is mounted beside the indicating tube and is adjustable lengthwise thereof, said frame having an index and scale graduations, and the combination therewith of a second index mounted upon the frame but adjustable relatively thereto lengthwise of the indicating tube and having a sighting portion adapted to be placed in register with the meniscus of the indicating column and being arranged to cooperate with the graduations of said scale.

Preferably the walls of mercury pot are concentric with a horizontal axis, the pot being preferably cylindrical, and arranged with its axis horizontal, or in other words parallel to the axis about which the indicator is turned when its inclination is changed, and there is provided a displacer 60, which is mounted upon one of the end walls of the pot and projects toward the opposite end wall. As shown in Figure 3, this displacer is an integral boss on the rear wall, although it might equally well be formed on the front wall. It is completely submerged in the mercury, and it is properly spaced on all sides from the sides of the pot to permit the surface of the mercury to maintain the same level, whatever may be the angle at which the indicator is tilted. In the form here shown, and as indicated by dotted lines in Figure 4, the outline of the displacer is that of a sector of a circle, of which the circumferential part is concentric with the cylindrical wall of the pot; but this form may be departed from, and any other form substituted which obtains results equivalent to those here sought, as above set forth.

So far as the basic principles of the invention are concerned, such principles may, of course, as well be embodied in connection with a vertical indicating column as with a column which is inclined in the manner fully described in the foregoing specification. The latter figure also shows in dotted lines a pipe 66 connecting the head of the indicator or manometer tube with the tank in a leakage tight manner. Such a tube exemplifies means for equalizing the pressure on the head of the indicating column and the pressure within the tank in case the latter pressure is greater or less than atmospheric. That is, the specific gravity of the liquid may be determined with two pipe lines, a vertical indicating column, and suitable scales or index means; and in the use of the apparatus upon ships this form would ordinarily be employed. Having determined the specific gravity, the depth, weight, volume, and so forth of the liquid is determinable from the reading of the indicator column by applying to such reading a correction for the actual specific gravity. For reference to such an instrument attention is directed to Figure 12, in which corresponding reference characters designate the same or equivalent parts as already described in detail.

Nothing in the foregoing description of use is to be construed as limiting my protection in any way to use in connection with containers in which the internal pressure is atmospheric, or as excluding use when the pneumatic pressure in the container is either greater or less than atmospheric; as in such cases connection may be made between the upper end of the manometer tube and the container.

What I claim and desire to secure by Letters Patent is:

1. A means for determining depths and specific gravities of liquids, comprising pipe lines adapted to be submerged in the liquid and having discharge orifices at a known vertical height apart, a liquid column indicator having a chamber in communication with said pipe lines, and means for creating pneumatic pressures in said pipe lines and chamber sufficient to balance the heads of liquid above the respective outlets.

2. A depth and specific gravity indicating apparatus, comprising conduits adapted to be submerged in liquid and severally having outlets at a known vertical distance apart, means for creating pneumatic pressures in each conduit sufficient to balance the head of liquid above the outlet thereof, and means for measuring the difference between the pressures so created in the several conduits in comparison with the corresponding pressure difference in a liquid of known specific gravity.

3. A depth and specific gravity indicating apparatus, comprising conduits adapted to be submerged in liquid and severally having outlets at a known vertical distance apart, means for creating pneumatic pressures in each conduit sufficient to balance the head of liquid above the outlet thereof, and column indicating means in suitable arrangement and connection with said conduits to register the difference between the said pneumatic pressures therein.

4. A depth and specific gravity indicating apparatus, comprising conduits adapted to be submerged in liquid and severally having outlets at a known vertical distance apart, means for creating pneumatic pressures in each conduit sufficient to balance the head of liquid above the outlet thereof, column indicating means in suitable arrangement and connection with said conduits to register the difference between the said pneumatic pressures therein, and a measure arranged to be read in connection with the positions of said column indicating means responsive to the respective pressures.

5. A depth and specific gravity indicating apparatus, comprising conduits adapted to be submerged in liquid and severally having outlets at a known vertical distance apart, means for creating pneumatic pressures in each conduit sufficient to balance the head of liquid above the outlet thereof, column indicating means in suitable arrangement and connection with said conduits to register the difference between the said pneumatic pressures therein, and a measure arranged to be read in connection with the positions of said column indicating means responsive to the respective pressures, said measure being graduated in terms of specific gravity.

6. An apparatus for measuring depth and specific gravities of liquids by applying pneumatic pressure equal to the head of the liquid at the point of measurement and determining the intensity of such pressure, comprising the combination of fluid conducting means having separate outlets at a given vertical distance apart adapted to be submerged in the liquid, pneumatic pressure applying means in communicating association with said conducting means, and pressure measuring means adapted to indicate the pressures developed by said pressure applying means in the conducting means.

7. An apparatus for measuring depth and specific gravities of liquids by applying pneumatic pressure equal to the head of the liquid at the point of measurement and determining the intensity of such pressure, comprising the combination of fluid conducting means having separate outlets at a given vertical distance apart adapted to be submerged in the liquid, pneumatic pressure applying means in communicating association with said conducting means, and column indicating means in communication with said conducting means for registering pressures developed therein, being adjustable angularly to vary the length of the indicating column in conformity with the specific gravity of the liquid.

8. A depth and specific gravity measuring apparatus comprising a column indicator adapted to be tilted at various inclinations, fluid conducting means having outlets at different levels a given distance apart adapted to be submerged in liquid, and means for applying in said conducting means and to said indicator pneumatic pressures sufficient to balance the head of liquid above each of said outlets in turn.

9. A depth and specific gravity measuring apparatus comprising a column indicator adapted to be tilted at various inclinations, fluid conducting means having outlets at different levels a given distance apart adapted to be submerged in liquid, means for applying in said conducting means and to said indicator pneumatic pressures sufficient to balance the head of liquid above each of said outlets in turn, and a longitudinally movable specific gravity scale adjacent to said indicator.

10. A depth and specific gravity measuring apparatus comprising a column indicator adapted to be tilted at various inclinations, fluid conducting means having outlets at different levels a given distance apart adapted to be submerged in liquid, means for applying in said conducting means and to said indicator pneumatic pressures sufficient to balance the head of liquid above each of said outlets in turn, an arcuate specific gravity scale arranged to cooperate with the indicator in its angular movements, and a straight specific gravity scale arranged beside the indicator.

11. A depth and specific gravity measuring apparatus comprising a column indicator adapted to be tilted at various inclinations, fluid conducting means having outlets at different levels a given distance apart adapted to be submerged in liquid, means for applying in said conducting means and to said indicator pneumatic pressures sufficient to balance the head of liquid above each of said outlets in turn, and a specific gravity scale beside the indicator having a unit length equal to the length of the column in said indicator sufficient to balance the head of a liquid of unit specific gravity equal to the vertical distance between said outlets, when the indicator is placed at a given angle.

12. A specific gravity indicating apparatus comprising a mercury column manometer, a plurality of pipe lines adapted to be submerged in liquid and having discharge orifices at different levels a given vertical distance apart, means for applying pneumatic pressure to said pipe lines and to the manometer, and means for excluding such pressure from either submerged pipe line at will.

13. A specific gravity indicating apparatus comprising a mercury column manometer, a plurality of pipe lines adapted to be submerged in liquid and having discharge orifices at a given vertical distance apart, means for applying pneumatic pressure to said pipe lines and to the manometer, and means for excluding such pressure from either submerged pipe line at will, said manometer being adjustable to make different angles with the horizontal.

14. A specific gravity indicating apparatus comprising a mercury column manometer arranged with capability for placement at various inclinations, a plurality of pipe lines adapted to be submerged in liquid and having discharge orifices at a given vertical distance apart, means for applying pneumatic pressure to said pipe lines and to the manometer, means for excluding such pressure from either submerged pipe line at will, and an angular scale cooperative with said manometer and designating the inclination thereof in terms of specific gravities.

15. A specific gravity measuring apparatus comprising a column manometer containing an indicating fluid and being angularly adjustable to change its inclination to the horizontal, fluid conducting means having discharge orifices adapted to be submerged to different depths in liquid, and means for applying pneumatic pressure in said conducting means sufficient to balance the head of the liquid above each of said orifices independently; the angular adjustability of the manometer permitting placement of the latter at an inclination where the length of the indicating column balancing the head of liquid equal to the vertical distance between said orifices is a predetermined amount.

16. In a pneumatic depth measuring apparatus an angularly adjustable manometer tube and a chamber containing indicating liquid connected to said tube and being adjustable therewith, said chamber having a wall curved about a horizontal axis and having a displacer submerged in the indicating liquid, between which and the curved wall of the chamber there is a fluid containing space entirely surrounding the displacer.

17. An indicator for the apparatus set forth comprising a cylindrical mercury chamber arranged with its axis horizontal and being adjustable about a horizontal axis, an indicating tube connected to said chamber and projecting in a generally radial direction therefrom, and a displacer connected to one of the end walls of the chamber and projecting toward the opposite end wall, being submerged entirely in the indicating liquid and formed to provide a continuous passage between itself and the cylindrical walls of the chamber from each side to the other.

18. A specific gravity indicating apparatus, comprising fluid conduits having orifices at different levels a given distance apart adapted to be submerged in liquid, a manometer coupled to said conduits for actuation by the fluid pressure in each in turn, said manometer having a movable indicating element, and an index device for reading specific gravities consisting of a connected slighting index and scale movable together to place said sighting index in register with one of the positions of said indicating element, and a second sighting index independently movable into register with another position of the indicating element and being correlated with said scale to cause indication by the latter of the specific gravity of the liquid.

19. An apparatus for determining specific gravities comprising two pipe lines adapted to be submerged in liquid and each having a submerged orifice, which orifices are at different levels a fixed distance apart, a manometer having a movable pressure indicating element, said manometer being coupled with said pipe lines, means for subjecting the manometer to the pressure existing in each pipe line in turn, whereby said indicating element may be placed in different positions according to the different depths of submergence of the orifices, and an index or reading device associated with said manometer and comprising two sighting indexes coupled together and movably mounted in parallel with the path of said indicating element, one of said indexes being movable relatively to the other and said index device having also a scale of specific gravities cooperating with the movable sighting index to indicate the specific gravity of the liquid according to the distance between the sighting indexes.

20. A depth and specific gravity measuring apparatus comprising a manometer having a movable indicating element, fluid conduits having outlets at different levels a fixed distance apart adapted to be submerged in liquid, means for connecting each of said conduits in turn with the manometer whereby to influence the indicating element of the latter in accordance with the pressures existing in the respective conduits, and a specific gravity index device comprising two sighting indexes and a scale movable as a unit parallel to the path of movement of said indicating element, one of said sighting indexes being movable relatively to the other and cooperating with said scale to show by its relative movement the specific gravity of the liquid in which said outlets are submerged.

21. The combination with a manometer having an indicating element, of an index device comprising a frame mounted adjacent to the path of movement of said indicating element and adjustable longitudinally therof, said frame having a scale of specific gravities, an index cooperative with said element, and a second index adjustably mounted on said frame with provision for movement relatively thereto and longitudinally of said path of movement, and being arranged with sighting means to correlate the positions of the indicating element with the graduations of said scale.

22. An index device adapted to be applied for use in combination with a manometer having an indicator, consisting of a portable frame, an index and scale graduations fixed on said frame, and an adjustable index mounted upon said frame and being movable thereon along said scale graduations; said index being adapted to be placed in register with the indicator of said manometer.

23. An index device comprising a frame having a scale and a sighting index, a guide member associated with said frame, a second sighting index mounted upon said guide member and being adjustable thereon to alter its distance from the first named index and means for connecting said frame with a pressure indicator in a manner permitting adjustment of the entire index device along the line of indication of said indicator.

24. An index device for column manometers comprising a frame adapted for placement beside and adjustment longitudinally of a column indicator and having a sighting index arranged to extend across said column indicator and to register with the end of the column thereof, a guide member associated with said frame, and a second index also adapted to extend across the column indicator and register with the end of the column thereof, mounted adjustably on said guide member whereby to be movable relatively to said frame longitudinally of the indicator, said frame having a scale in fixed relation to said first named index arranged to cooperate with said second index.

25. An index device for determining specific gravities of liquids in cooperation with a column manometer, consisting of a frame adapted to be mounted adjacent to such manometer with provision for adjustment longitudinally thereof, said frame having a relatively fixed index adapted to be placed across and in register with the head of the indicating column in one position thereof, and having a scale in terms of specific gravity fixed relatively to said index, and a second index mounted adjustably on said frame with capability for being placed in register with the head of the indicating column in a different position thereof, and arranged to correlate the last named position with said scale.

26. An index device for reading values indicated by a manometer, comprising a frame, two indexes, one relatively stationary on the frame and the other relatively movable toward and away from the first index, means for making the second index fast in various positions more or less distant from the first index, and a scale on said frame arranged to show values in conjunction with the position of the second index.

27. An apparatus for indicating the specific gravity of a liquid at various levels in a body of such liquid, comprising flexible pipe lines having orifices, and adapted to be raised or lowered to given strata in the body of liquid, and so that the orifices are at a known distance apart, a manometer, means for connecting either pipe line exclusively to said manometer, and means for creating pneumatic pressure in each line equal to the pressure head of the liquid at the orifice of that line.

In testimony whereof I have affixed my signature.

CECIL W. STANCLIFFE.